United States Patent [19]

Saito et al.

[11] Patent Number: 4,764,488

[45] Date of Patent: Aug. 16, 1988

[54] HIGH TOUGHNESS CERAMIC COMPOSITES CONSISTING OF CERAMIC BODY REINFORCED WITH METAL FIBER

[75] Inventors: Makoto Saito; Takao Mizoguchi, both of Hyogo, Japan

[73] Assignee: Kabushiki Kaisha Kobe Seiko Sho, Kobe, Japan

[21] Appl. No.: 911,213

[22] Filed: Sep. 24, 1986

[30] Foreign Application Priority Data

Sep. 24, 1985 [JP] Japan ................................. 60-211250

[51] Int. Cl.⁴ ............................................ C04B 35/02
[52] U.S. Cl. ........................................ 501/95; 501/94; 428/364
[58] Field of Search ................... 501/95; 428/364, 367

[56] References Cited

U.S. PATENT DOCUMENTS 4,585,487 4/1986 Destree et al. ...................... 428/364

FOREIGN PATENT DOCUMENTS

| | | | |
|---|---|---|---|
| 0130105 | 1/1985 | European Pat. Off. .............. | 501/95 |
| 0137366 | 8/1984 | Japan ..................................... | 501/95 |
| 0112677 | 6/1985 | Japan ..................................... | 501/95 |
| 0200863 | 10/1985 | Japan ..................................... | 501/95 |

*Primary Examiner*—William R. Dixon, Jr.
*Assistant Examiner*—James M. Hunter, Jr.
*Attorney, Agent, or Firm*—Oblon, Fisher, Spivak, McClelland & Maier

[57] ABSTRACT

Described herein is a high toughness ceramic composite of the fiber reinforced type, comprising: metal fiber integrally anchored in a ceramic matrix and having a shape of triangular waves forming bent portions alternately on the opposite sides thereof with an angle θ of the bent portions in a range between 60° and 165°, a ratio of d/H (a ratio of the amplitude H of the waves to the diameter d of the fiber) in a range between 0.025 and 0.6, and a ratio of ρ/d (a ratio of the radius of curvature ρ at the apex of the bent portion to the fiber diameter d) greater than 1, inclusive.

6 Claims, 7 Drawing Sheets

SPECIMENS IN THREE-POINT FLEXURE TEST

UPPER: STRAIGHT FIBER REINFORCED CERAMIC
MATRIX COMPOSITE
LOWER: SHAPED FIBER REINFORCED CERAMIC
MATRIX COMPOSITE

FIGURE 10

HIGH TOUGHNESS CERAMIC COMPOSITES CONSISTING OF CERAMIC BODY REINFORCED WITH METAL FIBER

BACKGROUND OF THE INVENTION

1. Field of the Invention

This invention relates to fiber reinforced ceramics (FRC), and more particularly to high toughness ceramic composites having metal fiber integrally anchored in a ceramic matrix, suitable for application to high temperature iron making parts such as hot rolling rolls, continuous casting rolls, and other parts, which are required to have high toughness, along with abrasion resistance and heat resistance.

2. Description of the Prior Art

Ceramics generally possess extremely attractive properties including markedly high resistances to abrasion, heat and corrosion as compared with metallic materials and a small specific gravity, so that they have long been widely utilized commercially. However, due to extremely high brittleness, their applications to structural materials and major parts have been practically limited in spite of the above-mentioned excellent properties. On the other hand, after the so-called energy crisis, there has been a growing demand for heat resistant materials with ultra-high abrasion resistance. This has caused an increase in attempts to improve the toughness of ceramics, mainly in the following two streams.

The first one, which is called fine ceramics, intends to purge the defects or impurities by using fine ceramic powder as raw material. The other one aims to improve the toughness by compounding a ceramic material with another material. In the former case, with respect to the bending strength, it has become possible to obtain about ten times as high strength as compared with conventional monotonic ceramics, thanks to the progress of the HIP or hot pressing technology. However, experiments have revealed large irregularities in strength, which is very dependent on the size of specimens.

Furthermore, the ceramic itself is extremely low in plastic deformability, and incapable of relieving a localized concentration of stress by plastic deformation in a manner similar to metallic materials. Due to brittleness of ceramics, utmost care has to be paid in designing to prevent fracture from accelerating from a small defect or impurity. For these reasons, the ceramics lack reliability as a structural material and have not yet reached the stage of replacing metallic materials.

On the other hand, with respect to the ceramic composites, initially, attempts were made to enhance the toughness by a method of compounding ceramic fiber such as carbon fiber and SiC whiskers. This method has considerably improved the toughness of composites for a matrix of glass or the like, but exhibits no marked effect for major high strength ceramics, such as $Al_2O_3$, $Si_3N_4$ and $ZrO_2$. Simply speaking, this is considered to be attributed to brittleness of the ceramic fiber itself. Therefore, attempts have also been directed to compounding with ductile metal fibers, such as in the case of $Si_3N_4$ matrix Ta composite and $Si_3N_4$ matrix W fiber-reinforced composite. However, $Si_3N_4/W$ FRC fails to produce the expected effect due to degradation of W fiber, which is deteriorated to form $W_3Si_2$, as a result of the reaction with $Si_3N_4$ during a sintering process.

On the other hand, there has been a report ("Special Ceramics 6" by Brennan J. J., pp 123-134 (1075)) that $Si_3N_4/Ta$ FRC is markedly improved in charpy impact energy. Nevertheless, it is deteriorated in strength since Ta is far lower than the ceramic in elastic modulus. There is another problem that cracks propagate in the direction of metal fiber upon destruction, causing the ceramic to fall off and disintegrating the whole body of the composite material. Therefore, there are only few examples in which a ceramic composite is used as a structural material. Namely, the ceramic composites for structural materials have not yet reached a stage of completion.

SUMMARY OF THE INVENTION

The brittleness which is the greatest drawback of the ceramic material means that the material is fractured by application of small energy. It implies that a fracture is caused by a small stress and that, once a crack occurs, it will propagate easily and quickly to destruct the whole body of the material.

Since ceramics are extremely low in plastic deformability, a crack can be initiated even from a very fine defect or impurity. In order to enhance the strength, it is necessary to prevent the occurrence of crack, that is to say, to minimize the size of defects and impurities. The fine ceramics, which constitutes a main stream in the development of ceramics for structural materials, has been developed on the basis of this concept. It aims at the suppression of crack initiation by enhancing the fineness and purity of ceramic raw material powders, and by the use of an HIP or hot pressing processes. However, with the methods of this sort, the strength is still affected by impurities or defects, and the level of strength varies depending upon the effective volume of the material (because the probability of existence of crack initiation defects or the like is proportional to the effective volume). Furthermore, no improvement has been made to eliminate the problem that when a crack, once occurs, it will immediately propagate to cause destruction of the material as a whole. This causes the ceramic to lack reliability as a structural material.

The present invention contemplates to solve the above-mentioned problems by the provision of a high toughness ceramic composite which has a large number of metal fiber filaments intergrally anchored in a ceramic matrix. The metal fiber filaments (FIG. 2) have a shape of alternate triangular waves consisting of alternating bent portions with an angle $\theta$ between 60° and 165° (Preferably in a range between 75° and 150°, more preferably between 90° and 135°), a ratio of d/H (a ratio of the height or amplitude H of the waves to the diameter d of the fiber filaments) in a range between 0.025 and 0.6 (preferably in a range between 0.05 and 0.4, and more preferably between 0.1 and 0.3), and a ratio of $\rho/d$ (a ratio of the radius of curvature $\rho$ at the apex of the bent portion A) greater than 1.0 (preferably in a range between 1.5 and 3).

Figure 10:
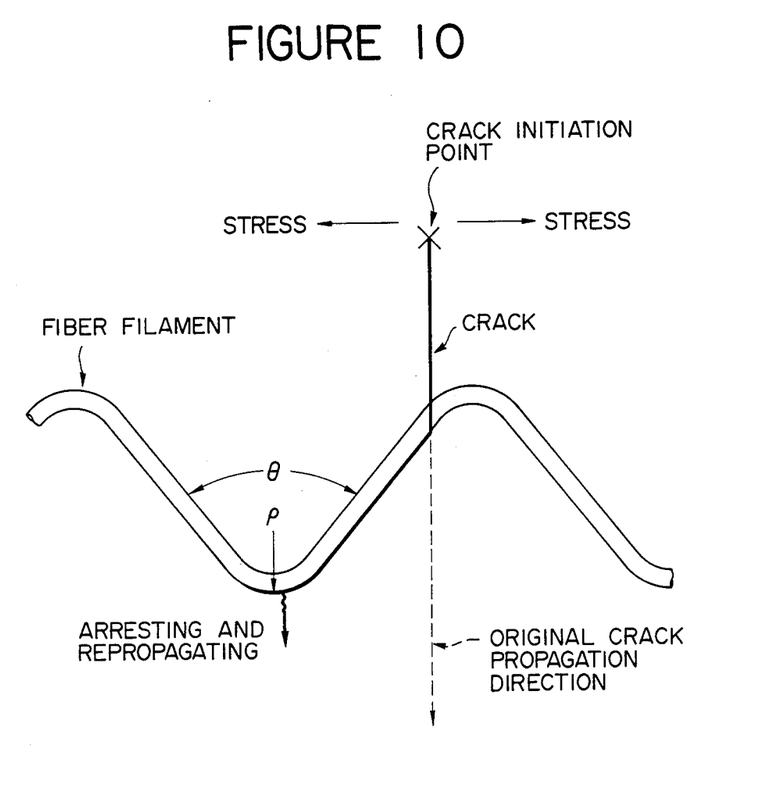
FIG. 10 schematically shows the crack arresting mechanism of the fiber filament employed in the present invention.

As stated above, the present invention concerns a ceramic composite having a great number of wavy metal fiber filaments, integrally embedded in a ceramic matrix. If a stress greater than a certain level is imposed on the composite material, a fine crack which initially occurs in the matrix, propagates through the latter. Upon reaching an adjacent fiber filament, it progresses along the interface between the fiber and matrix, depending upon the direction of the fiber filament. This is because the binding force of the interface is generally lower than the strengths of the matrix or the fiber filament itself. On the other hand, the bent portions A have a function of arresting a crack which has been developed along a fiber filament, as shown in FIG. 10, since propagation of the crack along the bent portion is intercepted by a large resistance (causing the crack to go back toward the initiation point). Repropagation of the crack in the original direction through the matrix is suppressed as the effective stress component which contributes to the crack propagation is reduced because the path of propagation has already been inclined from the original direction of propagation (a direction perpendicular to the axis of stress). Consequently, cracks which have occurred are immediately arrested after a travel over a micro-distance, and macroscopically, the fracture is suppressed to a marked degree.

The above and other object, features and advantages of the invention will become apparent from the following description and the appended claims, taken in conjunction with the accompanying drawings.

BRIEF DESCRIPTION OF THE DRAWINGS

In the accompanying drawings:

FIGS. 8(1) and 8(2) schematically show examples of fiber filaments of modified forms:

DESCRIPTION OF PREFERRED EMBODIMENTS

Figure 1:
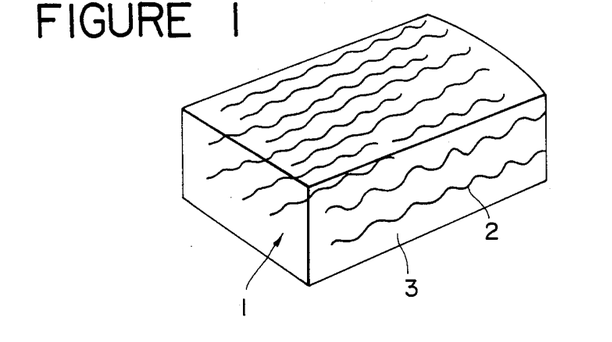
FIG. 1 is a schematic perspective view of a ceramic composite according to the present invention.
Figure 2:
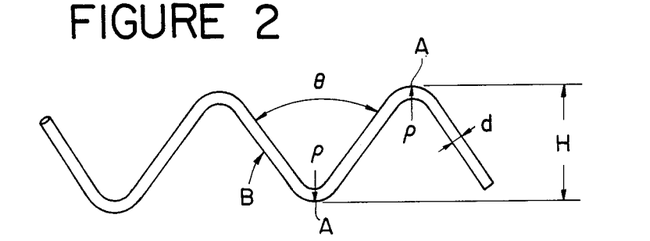
FIG. 2 is a schematic front view of a fiber filament employed in the present invention.

As an example, FIG. 1 shows a fiber reinforced ceramic composite according to the invention, incorporating fiber filaments of the shape as shown in FIG. 2. The process of the invention is shown below.

The reinforced composite 1 of FIG. 1 consists of a ceramic matrix of $Al_2O_3$, $Si_3N_4$, $ZrO_2$, Siyalone or the like, and fiber 2 of a metal with high toughness (e.g., W, Mo, Ta or SUS) oriented in a particular direction. The metal fiber filaments 2 are each bent into a zig-zag form or a series of triangular waves by alternate askew portions B. Straight metal fiber filaments can be shaped in such a zig-zag form, for example, by pressing or by passing though a pair of circumferentially toothed rolls.

The following experiments were conducted to determine the appropriate shape of the metal fiber 2 for serving as a reinforcement.

Experimental Procedures

1. Materials:
Matrix: $Al_2O_3$ (powder)
Fiber:
  Metal—W (tungsten)
  Shape—Filaments of 0.1, 0.2 and 0.5 mm in diameter and 40 mm in length formed into various triangular wavy shapes.
2. Sintering Process: Hot pressing, 1350° C.×500 atoms, orienting fiber in one direction.
3. Testing Method: Three-point flexure test
Dimensions of specimens: 6 mm×6 mm×40 mm (1)
Test Standards: JIS R 1610 (1981)

Prior to explaining the results of the above-mentioned tests, difference in fracture behavior between the composite according to the invention and a monotonic ceramic is exemplified below.

Figure 3:
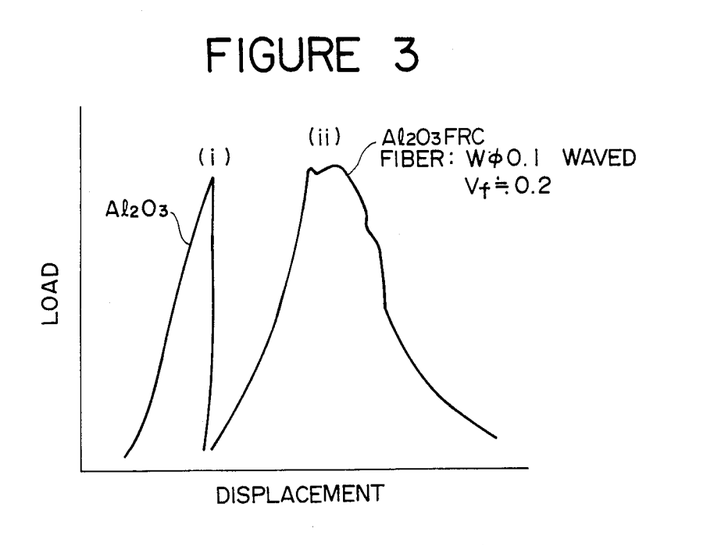
FIG. 3 is a graph showing the relationship between load and flexure, obtained by three-point flexure tests.

FIG. 3 shows the relationship between load and displacement in three-point flexure tests. As indicated at (i), in case of a specimen of a monotonic ceramic, the load increases smoothly up to the maximum load and thereafter suddenly drops to 0. This means that a fracture occurred at the maximum load point and suddenly brought about the fracturing. In contrast, in case of (ii), the load scarcely drops even if the displacement exceeds the maximum load point, and gradually drops after the displacement reaches a certain point. This means that the progress of the fracture was stable. The area enclosed by the X-axis (displacement) and the curve indicates the energy which was required for fracturing the specimen. Greater the energy reflects less susceptibility to fracture.

This energy of fracture was used as an indicator of toughness in the following experiments conducted for determining the shape of the fiber in selecting conditions for securing high toughness.

Of the fiber shape, the range of the angle $\theta$ of the bent portion A was determined in the following manner.

If a certain flexure or tensile stress is imposed on the composite according to the invention, a crack occurs in the matrix and develops in a direction perpendicular to the stress. On the other hand, since a great number of fiber filaments are embedded in the matrix, the crack encounters a filament after propagation over a micro-distance. If the straight portion of the filament lies in a direction within a suitable range relative to the direction of the propagation of the crack, the crack extents along the fiber filament at the interface between the fiber and matrix. As soon as the crack, which has extended along the fiber reaches a bent portion, its propagation is arrested under certain conditions. Since the fiber meanders in the fashion of triangular waves, the crack meets a too large resistance to extend along the fiber around the bent portion. Besides, its repropagation through the matrix in the original direction is now impossible due to a reduction of the effective stress component. Namely, as a result of propagation along a fiber filament, the crack locally lies obliquely relative to the original propagation direction, so that the effective stress component is reduced to a degree which is insufficient for developing the crack afresh in the original direction (normal to the stress axis).

In consideration of this mechanism, the range of the angle $\theta$ of the bent portion A (hereinafter referred to as "a bending angle") should be determined in terms of the effects of guiding a crack along a fiber filament and arresting the crack at a bent portion. In this connection, in order to guide a crack along a fiber filament, it is advantageous to employ a smaller bending angle $\theta$ which is closer to the original direction of crack propagation.

On the other hand, a larger bending angle $\theta$ is desirable to arrest a crack which has been developed along a fiber filament.

This is because a greater inclination from the original direction of propagation (normal to the stress axis) invites a greater reduction of the effective stress component which advances the crack in the original direction. Accordingly, the overall ability of arresting the development of a crack is determined as a compromise of these contrary behaviors.

Figure 4:
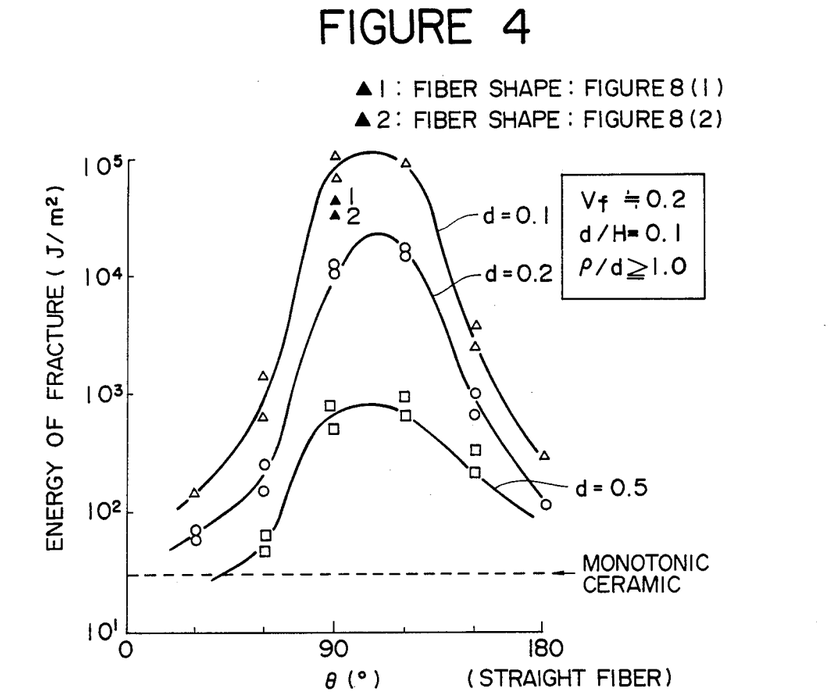
FIG. 4 is graph showing the relationship between the bending angle $\theta$ and the energy of fracture.

Shown in Table 1 and FIG. 4 are the results of the experiments, in which the relationship between the bending angle $\theta$ of fiber (on the abscissa) and the energy of fracture of the composite material (on the ordinate) were determined by the use of three different kinds of fiber filaments, with a volume fraction of fiber $Vf=0.2$ and $d/H=0.1$, a ratio of the amplitude H of the triangular waves to the diameter d of the fiber. Although the radius of curvature $\rho$ of the bending portion becomes greater as the angle $\theta$ is increased, the fiber was shaped in such a manner as to hold its ratio to the fiber diameter d, $\rho/d$, at a value greater than 1.0 even when the angle $\theta$ was minimum ($\theta=30°$). The absolute value of the energy varies largely depending upon the fiber diameter d, but the ranges of the bending angle $\theta$ which require a great energy for the respective fiber diameters substantially overlap with each other. Therefore, considering that the fiber diameter is less influential, the range of the bending angle $\theta$ was determined to be $$60° \leq \theta \leq 165°$$

In the regard, a too small bending angle $\theta$ is undesirable from the standpoint of manufacturing process since it will make the shaping operation difficult and necessitate a larger number of fiber filaments. On the other hand, filaments with an excessively large bending angle $\theta$ have possibility that their shape will deviate from the above-defined range due to deformation during a sintering process (by hot pressing or HIP) of the composite material.

Therefore, the angle $\theta$ is preferred to be in the range of $$75° \leq \theta \leq 150° \text{ (more preferably } 90° \leq \theta \leq 135°\text{)}$$

As mentioned hereinbefore, the absolute value of the energy varies depending upon the fiber diameter, presumably due to the difference in the number of fiber filaments per unit volume of the composite, namely, due to the differences in the number of the bending points and the distance between adjacent fiber filaments.

Figure 5:
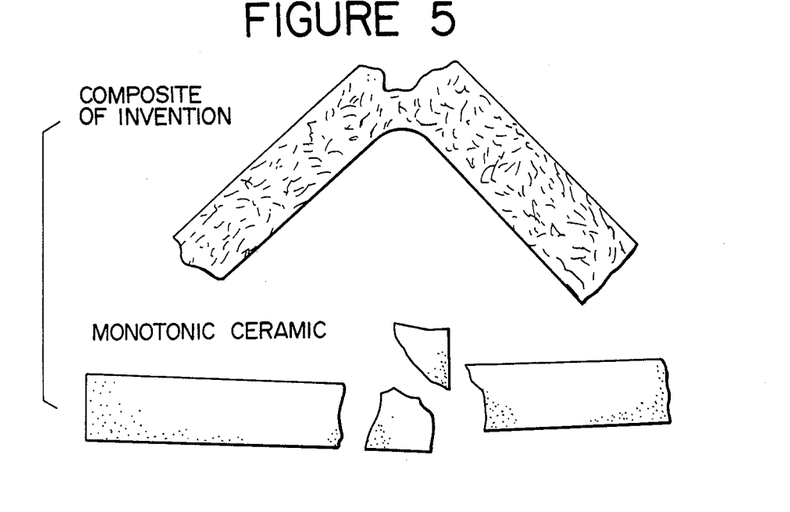
FIG. 5 mounts photographs of fractured test pieces of a composite according to the invention and a monotonic ceramic alone after a charpy impact test, showing appearance of fractures.

FIG. 5 shows an example of the specimen of the composite material according to the invention after a three-point flexure test. The ductile fracture behavior of the composite material will be understood more clearly by comparing the appearance of the specimens with the graph of FIG. 3.

Now, turning to the height (or amplitude) H of the waves of the fiber, it is equivalent to determine the length of the straight portions of the fiber filaments in a triangular wavy form, which guide the cracks. The ability of blocking propagation of a crack is considered to be determined by d/H, a ratio of the fiber diameter d to the amplitude H. Fiber with a d/H ratio close to 1 has no difference from straight fiber, so that it cannot be expected to have high resistance to crack propagation. On the other hand, in case the value of d/H is too small, namely, in case the fiber has a large amplitude, the straight portions of the fiber are elongated, causing embrittling propagation of cracks along the straight portions. Therefore, if the straight portions have a large length, each embrittling propagation will extend over a long distance, relatively lowering the crack resisting effect at the bent portion.

Figure 6:
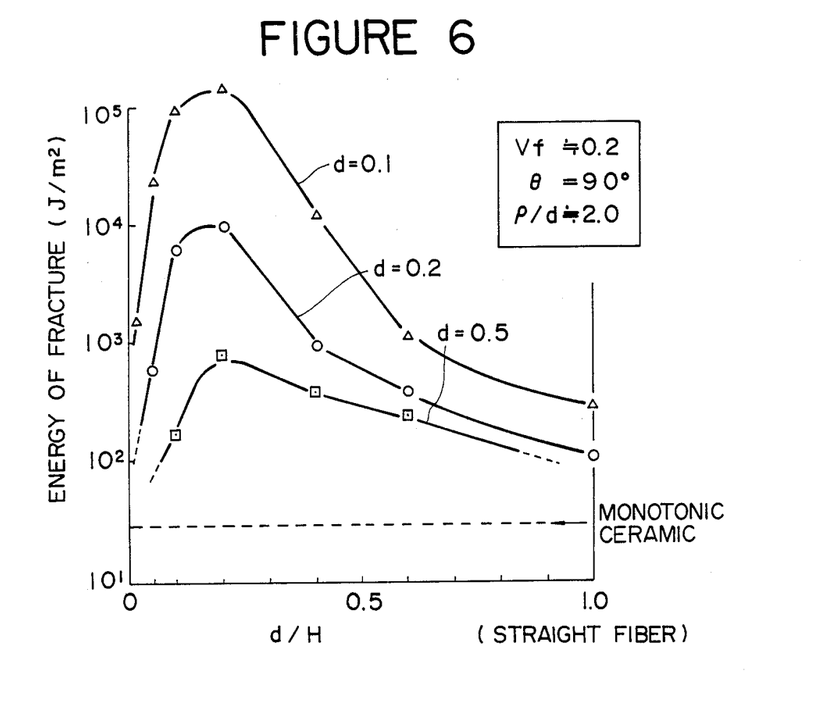
FIG. 6 is a graph showing the relationship between d/H and energy of fracture.

Table 2 and FIG. 6 show the level of the energy of fracture of composite materials which were varied in the ratio of d/H but same in the fiber volume fraction ($Vf=0.2$), bending angle ($\theta=90°$), and the ratio of the radius of curvature $\rho$ of the bent portion A to the fiber diameter d ($\rho/d=2$). The specimens of the composite materials used in the tests were of $Al_2O_3$(matrix)/W(fiber), which were sintered under the same conditions as in FIG. 4. As seen therefrom, although the absolute value of the energy varies depending upon the fiber diameter d, the range of d/H which secure a high energy level substantially overlap with each other irrespective of the values of $\theta$ and d. Therefore, the range of d/H with a high energy level is $$0.025 \leq d/H \leq 0.60$$

In this regard, a reduction in the value of d/H reflects a greater amount of fiber, while an increase in d/H might make the fiber shaping process difficult. From a standpoint of manufacturing process, it is preferred to be in the range of $$0.05 \leq d/H \leq 0.4 \text{ (more preferably } 0.1 \leq d/H \leq 0.3\text{)}$$

Figure 7:
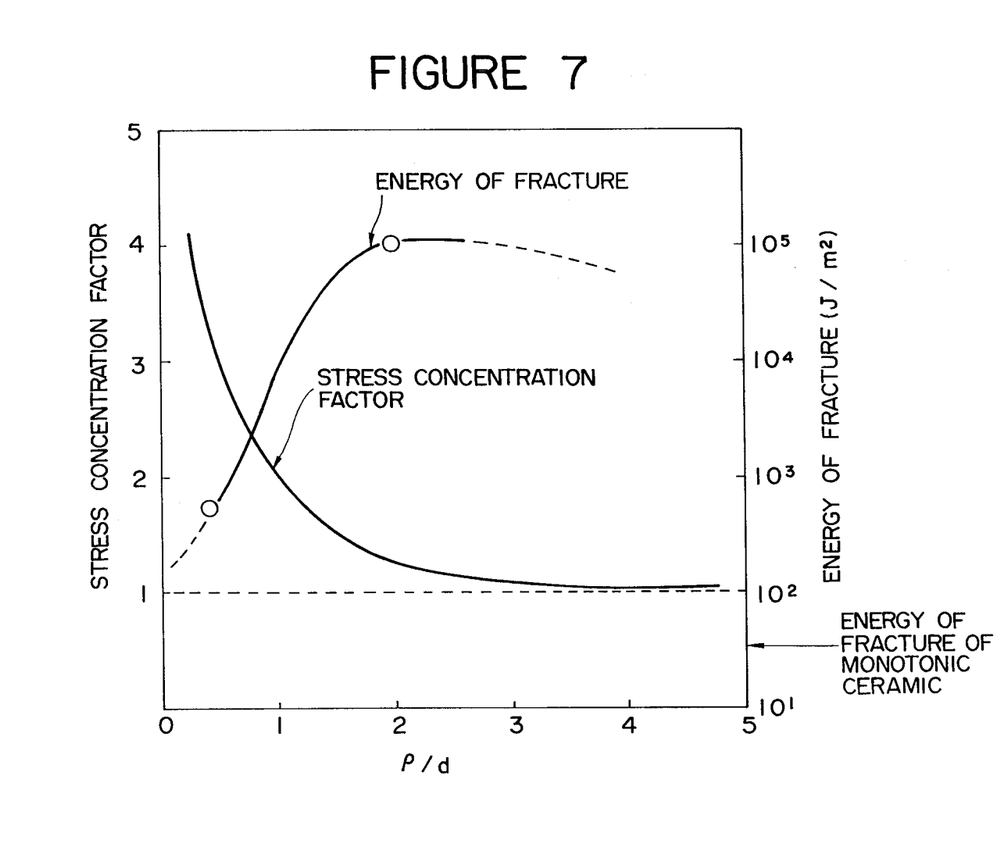
FIG. 7 is a graph showing the relationship between $\rho/d$ and stress concentration factor.

Reference is now had to FIG. 7 for explanation of the radius of curvature $\rho$ of the apex of the bent portion A. This factor $\rho$ relates to the ability of arresting the crack propagation, and, since it can be judged from the extent of stress concentration, can be expressed in terms of the relationship between the stress concentration factor and $\rho/d$ (FIG. 7). The value of $\rho/d$ should be greater than 1.0 as the stress concentration factor abruptly increases if $\rho/d$ drops below 1. A $\rho/d$ ratio of a small value is disadvantageous to the fiber bending process and will invite greater stress concentration. Therefore, it is preferred to be greater than 1.5. In addition, if $\rho/d$ is increased to some extent, its effect on the stress concentration factor is lowered. If increased too much, the period of the bent portions will be elongated, lowering the density of the bent portions to a corresponding degree.

Thus, it is preferred to be smaller than 3. In this instance, the stress concentration factor relates to rupture of the fiber itself, and also to hardness or easiness of a crack developing a fresh crack into the matrix from a bent portion after propagating along the fiber. The rupture of the fiber itself is mainly governed by $\rho$ on the inner side of a bent portion with a smaller radius of curvature, and the hardness of developing a fresh crack in the matrix is strongly governed by $\rho$ on the outer side of a bent portion at which repropagation of a crack is initiated. As the fiber and matrix are in intimate contact with each other, the radius of curvature of the bent portions exactly corresponds to the matrix portion which is in contact with the fiber. Accordingly, in view of the importance of the characteristics of the latter, the radius of curvature ρ on the outer side is considered here. For the purpose of confirming the effectiveness of the above-mentioned ρ/d, the energy of fracture was measured by use of fiber reinforced ceramic composites with ρ/d which would have an extremely large stress concentration factor. The results are shown in Table 3 and FIG. 7. With regard to the shape factors other than ρ/d, $\theta = \pi°$ and d/H=0.1. It is proved that, when the value of ρ/d is too small, the energy of fracture will not increase so much even if other conditions such as θ and d/H are satisfied.

As clear from the foregoing description, it suffices to satisfy the following conditions in order to suppress propagation of cracks in the ceramic composite, and the fiber is not necessarily required to be exactly in the triangular wave form as in the embodiment shown in FIG. 2. The effect of suppressing the propagation of cracks is produced by the following two functions.

(1) A function of guiding a crack, which has propagated through the matrix, into a substantially different direction, thereby lowering the effective stress component (effective stress intensity factor) of the crack: and (2) A function of arresting the propagation of a crack which has been guided through the fiber.

Figure 8:
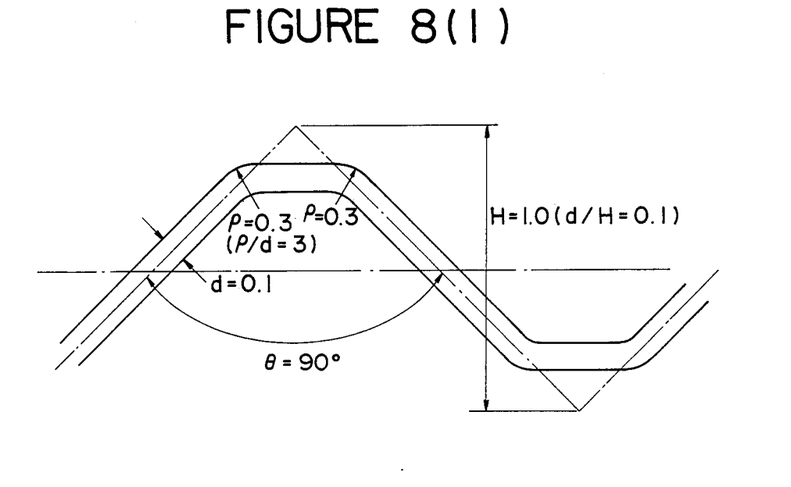

With regard to the function (1), the point is that part of the fiber has inclination and length of suitable ranges relative to the original direction of propagation of the crack (a direction perpendicular to the stress axis). With respect to the function (2), the point is that the fiber filaments should have a bent portion with a radius of curvature of a suitable range at the opposite ends of the guide portions. If these conditions are satisfied, it is possible to produce a similar propagation suppressing effect on cracks even in a case where the fiber is not exactly in the triangular wave form. For instance, it may be in the form of sine waves or trapezoidal waves overlapped with triangular waves, sine waves or trapezoidal waves of short periods. This was ascertained by testing characteristics of fibers of modified shapes. FIG. 8. shows fibers of modified shapes, and Table 1 and FIG. 4 show the levels of the energy of fracture of composite materials using such modified fibers (solid black marks). The shapes of the used fibers are fundamentally of a triangular wave shape as shown in FIG. 2, satisfying the above-described conditions for θ, d/H and ρ/d but partly modified in the apex shape of the bent portions using a radius of curvature within the above-defined range for ρ/d. Although the effect was lowered to some extent as compared with the composite material employing fiber of the basic triangular waves, there was observed a conspicuous improvement in toughness over the conventional composites using straight fiber filaments ($\theta = 180°$). Accordingly, the fiber of triangular wave shape according to the present invention contains not only fiber exactly of regular triangular waves which lie in one plane, but also fiber which is partly modified into other forms from the basic shape of triangular waves indicated by a chain line in FIG. 8. In this regard, the basic shape of triangular waves should satisfy the conditions of θ, d/H and ρ/d mentioned hereinbefore. The present invention also includes a fiber shape which consists of a curved line like a sine wave or the like. In such a case, the radius of curvature at the apex of the bent portion should satisfy the above-mentioned condition for ρ/d, and the triangular waves which are formed by drawing a straight line through the apexes of the bent portions should satisfy the above-mentioned conditions for θ and d/H.

As clear from the foregoing description, the ceramic composite according to the present invention employs fiber filaments each containing a large number of bent portions which in turn define therebetween a large number of indented areas. Therefore, even if a crack occurs in the matrix, it is immediately arrested after propagation through a very small distance corresponding to the distance between two adjacent bent portions, or to indented areas surrounded by the bent portions, preventing fracture of the whole body of the composite material. The crack is not repropagated unless the load is increased. Thus, a crack develops by repeating interception and repropagation in the composite material according to the present invention, so that the fracture toughness is enhanced to a marked degree, requiring consumption of enormous energy to fracture the composite material as a whole.

It is assumed that, in one cycle of the propagation and interception, a crack would develop through at most a distance corresponding to the height or amplitude H of the wave. Practically, since the fiber filaments are overlapped one over another, the average distance of propagation in one cycle is considered to be far smaller than H. Accordingly, the distance depends on the volume fraction of the fiber. A great number of fiber filaments are distributed three-dimensionally, so that cracks propagate in different directions in different localities. Consequently, considerable irregularities occur on a crack surface, so that the propagation of a crack is further met by a large resistance due to the three-dimensional irregularities of the crack plane.

Figure 9:
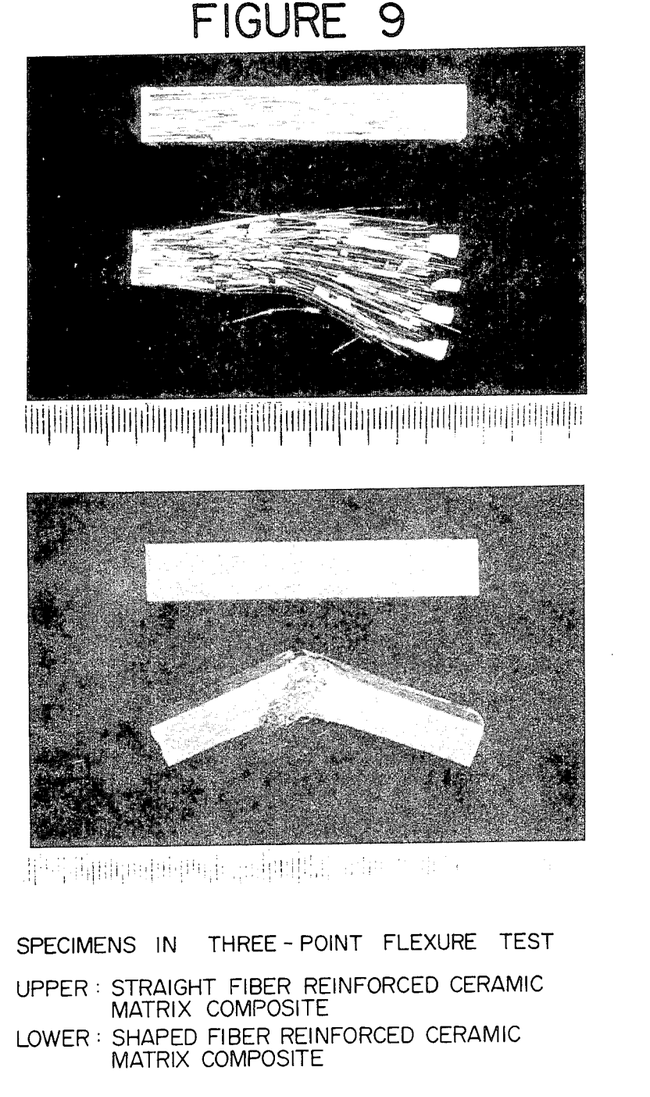
FIG. 9 mounts photographs of conventional straight fiber reinforced ceramic composite and the invented fiber reinforced ceramic composite before and after a three-point flexure test.

In a case where straight metal fiber is integrally anchored as in the conventional composite material, a crack propagates either along the interface between the fiber and matrix or in a direction perpendicular to the fiber as the fiber has no function of resisting the crack propagation. Therefore, the fiber filaments are completely detached from the matrix, and the material is disintegrated into a loose state as shown in FIG. 9.

As described hereinbefore, the strength and toughness of the composite material according to the invention are secured mostly by the capacity of resisting to crack propagation by metal fiber, without relying on the characteristics of crack generation. It follows that the composite material of the invention has a high reliability, less influenced by impurities and defects, and stable in property, and permits to design the fracture toughness itself to meet given conditions.

TABLE 1

| | Influence of Angle θ on Energy of Fracture | | | |
| | Energy of Fracture (J/m$^2$) | | | |
| θ | d = 0.1$^{mm}$ | d = 0.21$^{mm}$ | d = 0.5$^{mm}$ | Fiber Shape |
|---|---|---|---|---|
| 30° | 1.4 × 10$^1$ | 7.3 × 10$^1$ | — | FIG. 2 |
|  |  | 5.6 × 10$^1$ |  |  |
| 60° | 1.4 × 10$^3$ | 1.5 × 10$^2$ | 4.8 × 10$^1$ |  |
|  | 5.9 × 10$^2$ | 2.4 × 10$^2$ | 6.6 × 10$^1$ |  |
| 90° | 1.0 × 10$^5$ | 1.0 × 10$^4$ | 5.1 × 10$^2$ |  |
|  | 6.9 × 10$^4$ | 1.3 × 10$^4$ | 7.5 × 10$^2$ |  |
| 120° | 9.0 × 10$^4$ | 1.5 × 10$^4$ | 6.6 × 10$^2$ |  |
|  |  | 1.7 × 10$^4$ | 9.0 × 10$^2$ |  |
| 150° | 2.4 × 10$^3$ | 6.6 × 10$^2$ | 2.1 × 10$^2$ |  |
|  | 3.7 × 10$^3$ | 1.0 × 10$^3$ | 3.3 × 10$^2$ |  |
| 180° | 3.0 × 10$^2$ | 1.2 × 10$^2$ | — |  |
| 90° | 4.2 × 10$^4$ | — | — | FIG. 8-1 |
| 90° | 3.2 × 10$^4$ | — | — | FIG. 8-2 |

TABLE 2

| d/H | d = 0.1 mm | d = 0.2 mm | d = 0.5 mm | Fiber Shape |
|---|---|---|---|---|
| 0.025 | $1.7 \times 10^3$ | — | — | FIG. 2 |
| 0.05 | $2.6 \times 10^4$ | $5.9 \times 10^2$ | — | |
| 0.10 | $1.0 \times 10^5$ | $6.6 \times 10^3$ | $1.7 \times 10^1$ | |
|  | $6.9 \times 10^4$ |  |  | |
| 0.20 | $1.7 \times 10^5$ | $1.0 \times 10^4$ | $8.1 \times 10^2$ | |
|  |  | $1.3 \times 10^4$ |  | |
| 0.40 | $1.3 \times 10^4$ | $1.0 \times 10^3$ | $4.1 \times 10^2$ | |
| 0.50 | — | — | $5.1 \times 10^2$ | |
|  |  |  | $7.5 \times 10^2$ | |
| 0.60 | $1.2 \times 10^3$ | $4.1 \times 10^2$ | $2.6 \times 10^2$ | |
| 1.00 | $3.0 \times 10^2$ | $1.0 \times 10^2$ | — | Straight |

Influence of Amplitude d/H on Energy of Fracture — Energy of Fracture (J/m²)

TABLE 3

| p/d | d = 0.1 mm | d = 0.2 mm | d = 0.5 mm | Fiber Shape |
|---|---|---|---|---|
| 2.0 | $1.0 \times 10^5$ | — | — | $\theta = 90°$, d/H = 0.2 |
|  | $6.9 \times 10^4$ |  |  | |
| 0.5 | $5.6 \times 10^2$ | — | — | $\theta = 90°$, d/H = 0.2 |

Influence of Radius of Curvature p/d on Energy of Fracture — Energy of Fracture (J/m²)

What is claimed is:

1. A high toughness ceramic composite of the fiber reinforced type, comprising:
    metal fiber integrally and substantially undirectionally anchored in a ceramic matrix and having a shape of triangular waves forming bent portions alternately on the opposite sides thereof with an angle $\theta$ of said bent portions in a range between 60° and 165°, a ratio of d/H (a ratio of the amplitude H of said waves to the diameter d of said fiber) in a range between 0.025 and 0.6, and a ratio of $\rho$/d (a ratio of the radius of curvature $\rho$ at the apex of said bent portion to the fiber diameter d) greater than 1, inclusive.

2. The high toughness ceramic composite of claim 1, wherein said angle $\theta$ is in a range between 75° and 150°.

3. The high toughness ceramic composite of claim 2, wherein the ratio of d/H is in a range between 0.05 and 0.4.

4. The high toughness ceramic composite of any one of claims 1 to 3, wherein the ratio of $\rho$/d is in a range between 1.5 and 3.

5. The high toughness ceramic composite of claim 2, wherein said open angle $\theta$ is in a range between 90° and 135°.

6. The high toughness ceramic composite of claim 3, wherein said ratio of d/H is in a range between 0.1 and 0.3.

* * * * *